(No Model.)
C. W. WHITE.
MECHANICAL MOVEMENT.
No. 395,677. Patented Jan. 1, 1889.
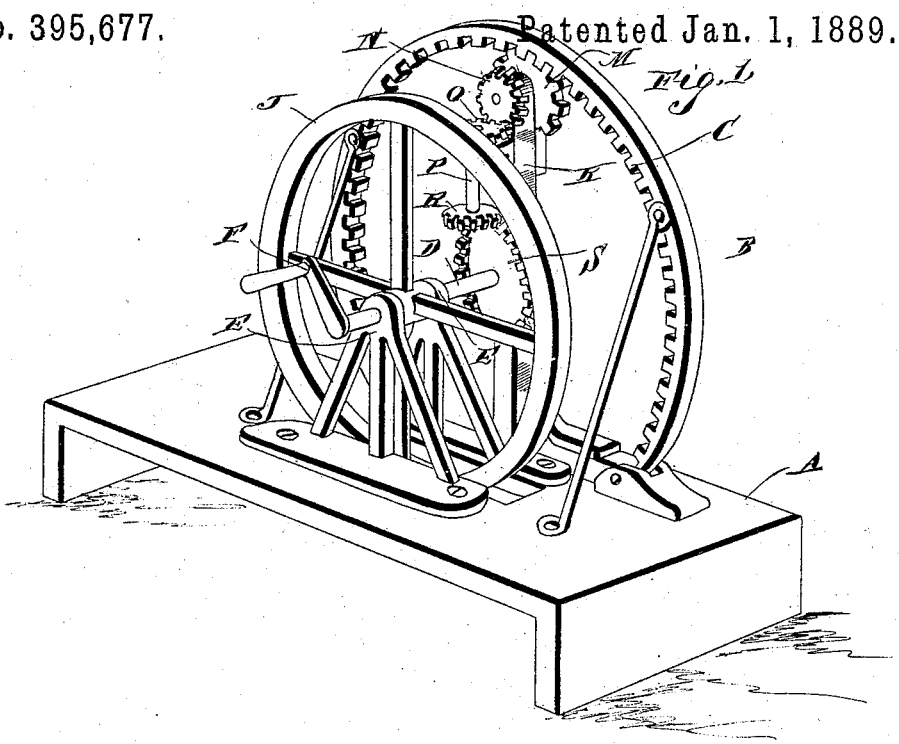
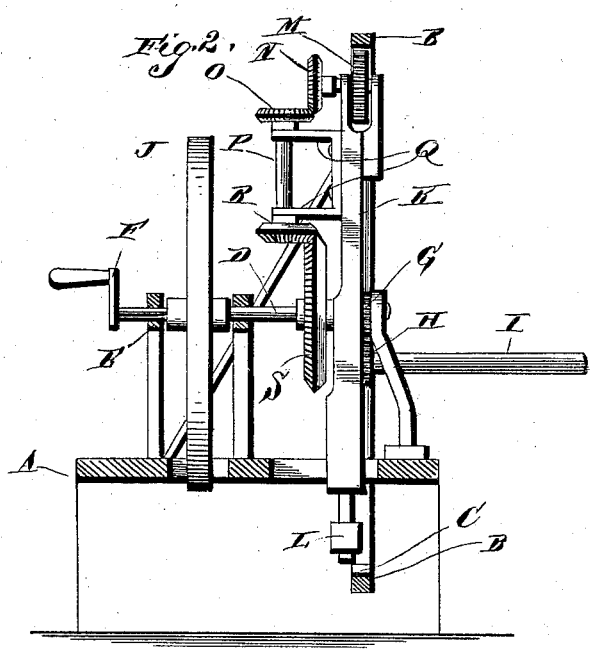
Witnesses:
C. S. Taylor
R. W. Bishop
Inventor,
Chas. W. White
By his Attorneys

UNITED STATES PATENT OFFICE.

CHARLES W. WHITE, OF SLEEPY EYE, MINNESOTA, ASSIGNOR OF THREE-FOURTHS TO THOMAS E. BOWEN, JOHN A. WHITE, AND MYRON C. BURNSIDE, OF SAME PLACE.

MECHANICAL MOVEMENT.

SPECIFICATION forming part of Letters Patent No. 395,677, dated January 1, 1889.

Application filed July 10, 1888. Serial No. 279,533. (No model.)

*To all whom it may concern:*

Be it known that I, CHARLES W. WHITE, a citizen of the United States, residing at Sleepy Eye, in the county of Brown and State of Minnesota, have invented a new and useful Improvement in Mechanical Movements, of which the following is a specification.

My invention relates to improvements in mechanical movements; and it consists in certain novel features, hereinafter described and claimed.

In the accompanying drawings, Figure 1 is a perspective view of my improved device, and Fig. 2 is a sectional view of the same.

Referring to the drawings by letter, A designates a suitable frame-work in which is rigidly secured a vertical ring, B, having internal gear-teeth, C, as shown. D designates a horizontal shaft, which is journaled in suitable bearings, E, on the upper side of the frame, and is provided with a crank, F, at one end, by means of which the device is set in motion. This shaft D is provided at its end opposite the crank with a gear-wheel, G, which meshes with a gear-wheel, H, on the end of a shaft, I, which extends to the machinery to be driven. A fly-wheel, J, is mounted on the shaft D at a proper point of its length, and a lever or weighted arm, K, is secured on said shaft adjacent to the gear-wheel H. This lever or arm K is provided with an adjustable weight, L, by which the lever is maintained on an even balance. The lever is arranged entirely within the plane of the rigid internal gear wheel or ring, D, and on the end opposite the adjustable weight I mount a pinion, M, which meshes with the internal gear-teeth of said ring B. The shaft of this pinion M projects slightly to one side of the lever, and a bevel-pinion, N, is mounted on said projecting end. This pinion N meshes with a similar pinion, O, on the outer end of a shaft, P, arranged longitudinally of the lever and journaled in suitable bearing-brackets, Q, projecting from the lever, as shown. On the inner end of this shaft P is mounted a bevel-pinion, R, which meshes with a bevel gear-wheel, S, on the main shaft D.

The operation of the device will, it is thought, be readily understood. The main shaft is revolved by means of the crank by hand or from any suitable motor, and the lever thus caused to rotate within the stationary internal gear wheel or ring, thereby putting in motion the pinion at the end of the lever, which in turn transmits the motion through the pinions described to the bevel gear-wheel S on the main shaft. By this means an even steady motion is imparted to the device.

My device is designed for use as an attachment for any class of machinery where power is used to revolve a wheel—as, for instance, between a water-wheel or engine and the machinery driven thereby.

Having thus described my invention, what I claim, and desire to secure by Letters Patent, is—

1. The combination of the main frame, the stationary ring having internal gear-teeth, the main shaft mounted on the frame, the lever mounted on the main shaft, a pinion on the end of the lever meshing with the gear-teeth of the stationary ring, and gearing between said pinion and the main shaft, as set forth.

2. The combination of the main frame, the stationary ring having internal gear-teeth, the main shaft, the lever mounted on the shaft, the pinion on the end of the lever meshing with the teeth of the stationary ring, the shaft mounted on the side of the lever and having pinions on its ends, and a bevel gear-wheel on the main shaft meshing with one of said pinions, the other one of said pinions being connected by gearing to the pinion meshing with the stationary ring, as set forth.

In testimony that I claim the foregoing as my own I have hereto affixed my signature in presence of two witnesses.

CHARLES W. WHITE.

Witnesses:
J. M. THOMPSON,
E. E. LOCKERBY.